United States Patent Office 3,228,920
Patented Jan. 11, 1966

3,228,920
CHELATING RESINS AND METHOD OF PREPARATION
Gaetano F. D'Alelio, South Bend, Ind., assignor, by direct and mesne assignments, to Metal Recovery Systems, Cleveland, Ohio
No Drawing. Filed May 12, 1960, Ser. No. 28,561
3 Claims. (Cl. 260—88.1)

This invention relates to the production of chelating resins and to new processes for preparing chelating resins. Generally, it is concerned with preformed crosslinked polymers having pendant coordination groups attached to the chain and to the process of preparing such polymers. More particularly, it deals with reacting (1) an organic compound (A) having (a) at least one reactive hydrogen and (b) at least one coordination group with (2) a crosslinked polymer (B) having functional groups selected from the class of oxirane,

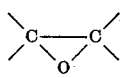

groups and carbonyl halide groups, preferably the carbonyl chloride (—COCl) groups.

One object of the invention is to provide an improved and economical method of preparing chelating polymers. Another object is to prepare chelating polymers with good physical properties. A still further object of the invention is to tailor-make a wide variety of new chelating resins. Further objects and advantages of the invention will become apparent as the description of the invention proceeds.

The object of this invention has been achieved by reacting crosslinked polymers having reactive functional groups of the type mentioned hereinabove with an organic compound containing an active (reactive) hydrogen and at least one coordination group. Such compounds are termed coordination compounds. When such compounds have more than one coordination group or position, ring formation can occur upon coordination with metal ions and such compounds are known as chelating compounds. However, when such compounds have only one coordination group or position and they are reacted with crosslinked polymers to become attached to such a polymer, the polymer will have a multiplicity of such coordination groups, thereby resulting in a chelating polymer. The coordination compounds used in the practice of this invention are substituted organic compounds having at least one active hydrogen and a coordination group selected from the class consisting of primary amino groups, —NH$_2$; secondary amino groups, >NH; tertiary amino groups, >N—; the aldehydo group,

the keto group, >C=O; the oximo group

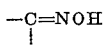

the aldimino group, —CH=NR; the ketimino group, >C=NR; the mercapto group, —SH; the thioether group, —SR; the thioaldehyde group,

the thioketo group, >C=S; the nitro group, —NO$_2$; and the nitroso group, —NO; wherein R is hydrogen and a lower alkyl group containing 1 to 6 carbon atoms. These coordination groups can function alone or in combination with each other or with salt forming groups, such as, carboxy, —COOH; phenol hydroxyl, —OH; the sulfonic, —SO$_3$H; the phosphoric,

the phosphorous,

etc. groups.

Typical coordination compounds of the kind mentioned are the amino acids, such as glycine, $$NH_2CH_2COOM$$

alanine, CH$_3$CH(NH$_2$)COOM; serine, $$HOCH_2CH(NH_2)COOM$$

cystene, HSCH$_2$CH(NH$_2$)COOM; aminobutyric acid, CH$_3$CH$_2$CH(NH$_2$)COOM; threonine, $$CH_3CH(OH)CH(NH_2)COOM$$

valine, (CH$_3$)$_2$CHCH(NH$_2$)COOM; norvaline, $$CH_3CH_2CH_2CH(NH_2)COOM$$

isovaline,

methionine, CH$_3$SCH$_2$CH$_2$CH(NH$_2$)COOM; leucine, $$(CH_3)_2CHCH_2CH(NH_2)COOM$$

aspartic acid,

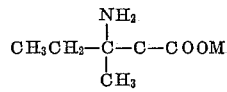

glutamic acid,

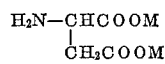

lysine, NH$_2$(CH$_2$)$_4$CH(NH$_2$)COOM; 1,2-diaminopropionic acid,

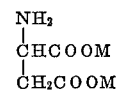

aminopimelic acid, HOOC(CH$_2$)$_4$CH(NH$_2$)COOM; beta-aminovaleric acid, CH$_3$CH$_2$CH(NH$_2$)CH$_2$COOM; hydroxyglycine, $$NH_2CH_2CH_2(OH)CH_2CH_2CH(NH_2)COOM$$

hydroxyethyl glycine, HOCH$_2$CH$_2$NHCH$_2$COOM; aminoethyl glycine, NH$_2$CH$_2$CH$_2$NHCH$_2$COOM; iminodiacetic acid, HN(CH$_2$COOM); iminodipropionic acid HN(CH$_2$CH$_2$COOM)$_2$; aminoethyliminoacetic acid,

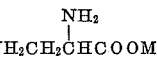

hydroxyethyliminodiacetic acid, $$HOCH_2CH_2N(CH_2COOM)_2$$

hydroxypropyliminodiacetic acid, $$HO(CH_2)_3N(CH_2COOM)_2$$

as well as 3-aminotyrosine, canavanine, 3-4-di-hydroxyl-phenylalanine, ethionine, ethionine sulfone, citrulline, creatine, creatinine, cysteic acid, cystine, dibromothyronine, glycocyanine, histidine, homocystine, hydroxyproline, methylhistidine, pennicillamine, pyroglutamic acid, thienylalanine, carboxymethyl aspartic acid, etc., wherein M represents H for the free acid as well as ammonium bases and metal, and lower alkyl and aryl radicals which can be used in the reaction and after the reaction hydrolyzed to the free acid or metal or ammonium salts.

Amino acids preferred in the practice of this invention are the aliphatic aminoacids having no more than about 20 carbon atoms therein, and having an amino group separated from a carboxylic group by no more than 2 carbon atoms. The aminoacids and their derivatives can have a plurality of amino and carboxylic groups therein and also can contain other functional groups therein which do not interfere with the addition of the amino group to the epoxy or acyl chloride group and also do not interfere with, but in some cases even may enhance, the chelating tendencies of the resultant products. Such amino acids are described more fully in applicant's copending application, Serial No. 28,558, filed the same date herewith.

Compounds of this type can be defined by the term HZ wherein H is an active (replaceable) hydrogen and Z is an organic radical having at least one coordination group. Other representative HZ compounds are, NH$_2$CH$_2$CH$_2$NH$_2$, NH$_2$CH$_2$CH$_2$CH$_2$NH$_2$
NH$_2$CH$_2$CH(CH$_3$)NH$_2$, NH$_2$(CH$_2$)$_4$NH$_2$
NH$_2$(CH$_2$)$_6$NH$_2$, HOCH$_2$CH$_2$NH$_2$
(HOCH$_2$CH$_2$)$_2$NH, (HOCH$_2$CH$_2$)$_3$N, NH$_3$
CH$_3$NH$_2$(CH$_3$)$_2$NH, C$_2$H$_5$NH$_2$, (C$_2$H$_5$)$_2$NH
HOCH$_2$CH$_2$NHCH$_3$, HOCH$_2$CH$_2$N(CH$_3$)$_2$
HOCH$_2$CH$_2$N(C$_2$H$_5$)$_2$, HOCH$_2$CH$_2$)$_2$NCH$_3$
polyvinylamine, NH$_2$CH$_2$CH(NH$_2$)CH$_2$NH$_2$ HSCH$_2$CH$_2$N(CH$_3$)$_2$ hydroquinone, catechol, resorcinol, orthoaminophenol, metaaminophenol, paraaminophenol, o-methylaminophenol, m-methylaminophenol, p-methylaminophenol, o-dimethylaminophenol, m-dimethylaminophenol, p-dimetholaminophenol, o-aminothiophenol, anthranalic acid, o-salicylaldehyde, the hydroxy salicylaldehydes, salicylaldehyde-oxime, hydroxysalicylaldehyde-oxime, 4-(o-hydroxyphenyl)3-butene-2-one, 2,4-dihydroxybenzophenone, 2,2',4,4' - tetrahydroxybenzophenone, 1-amino - 4 - hydroxyanthroquinone, anthraquinone, quinazarin, alizarin, quercetin, kojic acid, morin, amino-o-phenanthroline, aminoacetophenone, 1-aminoanthraquinine, 2-amino-anthraquinone, 2,4-dihydroxyacetophenone, 1,5-dihydroxyanthraquinone, anthraquinone, 2-aminoresorcinol, 4-aminoresorcinol, 5-amino-2,3-dihydro-1,4-phthalazinedione, 3-amino-pyridine, 2-aminopyridine, 4-aminopyridine, 2-amino-4-methylpyridine, amino-dipyridyl, 2-hydroxypyridine, hydroxydipyridyl, 2 - hydrazinoquinoline, 5-aminouracil, histamine, 4-(gamma-hydroxypropyl pyridine), dimethyl hydantoin, 2-hydrazino-benzothiazole, aminoacetamide, the nitroaminophenols, the dinitrophenol, the dinitroanilines, salicylamide, anthranilamide, aminosalicylamide, diaminobenzamide, guanazole, the aminoguanazoles, the aminodiazines, urea, thiourea, nitrosourea, 4-nitrosopiperazine, etc. All of the foregoing compounds have an active (replaceable) hydrogen and at least one coordination group.

The HZ compounds are reacted with crosslinked polymers having functional groups selected from the class consisting of oxirane groups

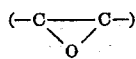

and carbonyl chloride groups, (—COCl) in other polymer structure. Such crosslinked polymers can be prepared by the following methods.

*Method 1.*—This method comprises copolymerizing a crosslinking monomer (A), that is, a monomer having a multiplicity of vinyl, vinylene, or vinylidene groups with another monomer (B) having at least one vinyl or vinylidene group together with an oxirane ring,

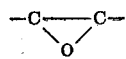

as part of its structure, such as the divinyl aryl monoxides, e.g.,

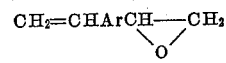

wherein Ar is C$_6$H$_4$, —C$_6$H$_3$(CH$_3$), —C$_6$H$_2$(CH$_3$)$_2$—, —C$_6$H$_3$Cl—, —C$_6$H$_3$F—, —C$_{10}$H$_6$—, —C$_6$H$_4$C$_6$H$_4$—, —C$_{10}$H$_5$Cl—, —C$_6$H$_4$C$_6$H$_3$Cl—, and the corresponding diisopropenyl aryl monoxides, e.g.,

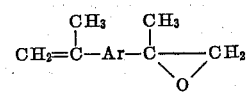

which are readily prepared by standard methods of peroxidizing the corresponding dialkenyl aryl compound; the vinyl aryl oxyepoxy alkanes, e.g.,

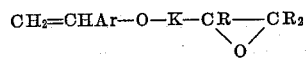

wherein R represents hydrogen and an alkyl radical of 1 to 8 carbon atoms, and K is a divalent alkylene radical having no more than 10 carbon atoms in the linear chain connecting said valencies and having a total of no more than 20 carbon atoms in said radical, and the corresponding isopropenyl aryloxyepoxyalkanes, e.g.,

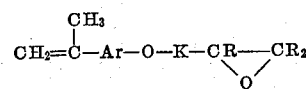

which are readily prepared by standard procedures by using the corresponding phenol and the corresponding chloroepoxyalkane,

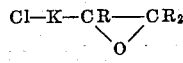

the acryloxyepoxyalkanes, e.g.,

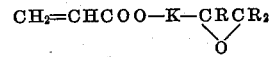

the methacryloxyepoxyalkanes, e.g.,

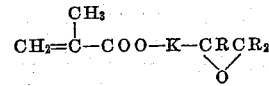

the chloroacryloxyepoxyalkanes, e.g.,

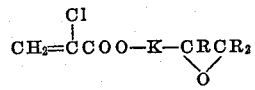

the vinylbenzoxyepoxyalkanes, e.g.,

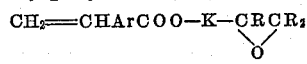

the cyanoacryloxyepoxyalkanes, e.g.,

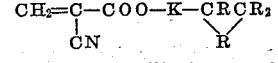

etc., which are prepared readily by esterifying the corresponding acid chloride or anhydride with a hydroxyepoxyalkane; the acrylamidoaryloxyepoxyalkanes, e.g.,

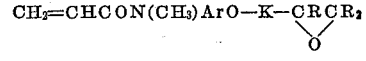

the methacrylamidoaryloxyepoxyalkanes, e.g.,

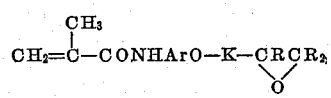

the chloroacrylamidoaryloxyepoxyalkanes, e.g.,

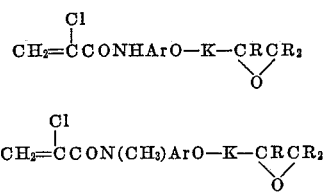

etc., all of which are prepared readily by reacting the phenolic type of acrylamidohydroxyaryls with a chloroepoxyalkane,

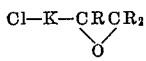

the glycidyloxyaryl maleimides, e.g.,

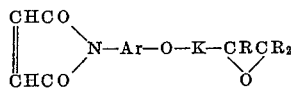

which are prepared readily from phenols of the type

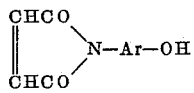

and the chloroepoxyalkanes,

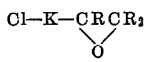

etc., wherein K and R are as defined above. A few typical examples of such compounds are

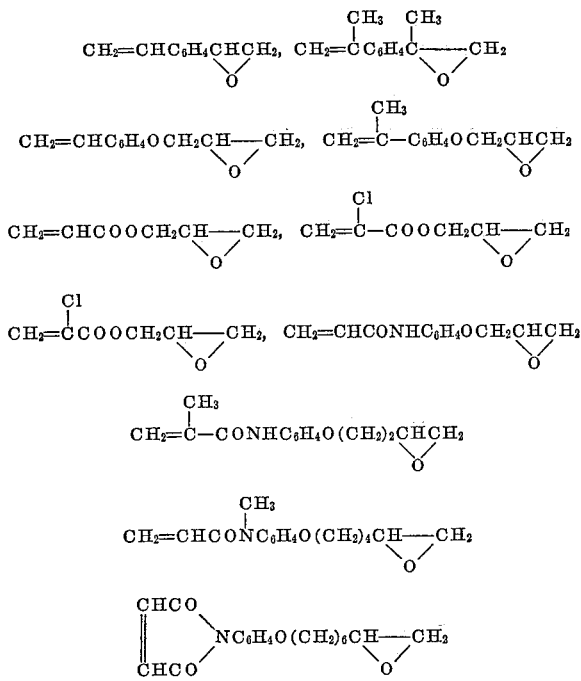

By copolymerizing such monomers with a crosslinking monomer, as for example by crosslinking divinylbenzene monoxide with divinylbenzene, there is obtained a crosslinked polymer having structures of the type,

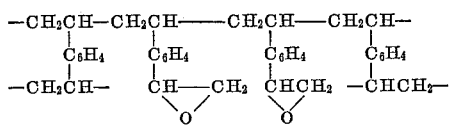

with which HZ compounds referred to hereinabove can be reacted by ring opening of the oxirane ring thus,

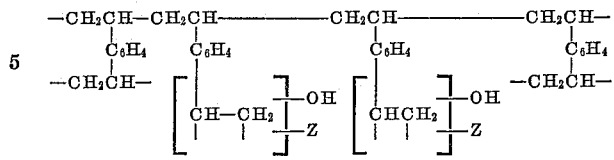

*Method II.*—This method comprises copolymerizing a crosslinking monomer (A), with another monomer (C) having a carbonyl halide, for example, the chloride group, (—COCl), together with at least one vinyl, vinylene, or vinylidene group as part of its structure, such as, for example, the acrylyl chlorides, e.g., $CH_2=CHCOCl$,

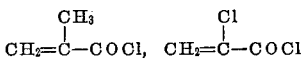

the alkenylarylcarboxyacid chlorides, e.g., $$CH_2=CHArCOCl$$

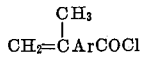

the alkenylaryloxyacylchlorides, e.g., $$CH_2=CHArO—K—COCl$$

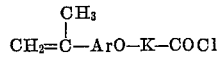

the itaconyl chlorides, e.g.,

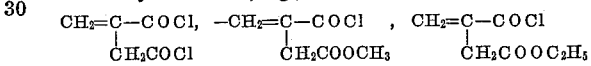

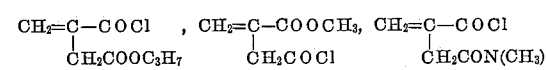

the maleyl- and fumaryl chlorides, e.g.,

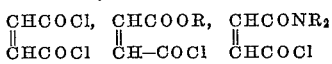

etc., and the corresponding bromides, iodides and fluorides.

A few illustrative examples of crosslinking monomers, that is, monomers having a multiplicity of vinyl, vinylene, or vinylidene groups are divinylbenzene, divinylnaphthalene, vinyl isopropenyl benzene, vinyl allyl benzene, diisopropenyl benzene, diallyl benzene; the polyunsaturated esters, such as ethylene glycol diacrylate, ethylene glycol dimethacrylate, trimethylene glycol dimethacrylate, diallyl itaconate, glycol maleate, diallyl succinate, divinylphthalate, diallyl maleate; the polyunsaturated ethers, such as divinyl ether, trimethylene glycol divinyl ether, hydroquinone divinyl ether, catechol divinyl ether, resorcinol divinyl ether, hydroquinone diallyl ether, catechol diallyl ether, resorcinol diallyl ether; vinyl allylphenyl ether, vinyl vinylphenyl ether, allyl vinylphenyl ether, vinyloxy-vinyl benzoate, vinyloxyallyl benzoate, allyloxy allylbenzoate; the polyunsaturated amides, such as ethylene diacrylamide, ethylene dimethacrylamide, N - vinylacrylamide, N,N' - divinylphthalic diamide, N,N'-diallylphthalamide, etc., and other polyunsaturated modifiers, such as vinyl phenylacrylate, 2-isopropenyl-5-acryloxynaphthalene, vinyl-3,5-diallyloxypalmitate, etc.

The crosslinking monomers can be used alone or in conjunction with each other or with other monomers having one vinyl, vinylene, or vinylidene group, such as vinyl chloride, vinylacetate, vinylpropionate, vinylbutyrate, vinylstearate, acrylonitrile, methacrylonitrile, vinylidene chloride, vinylidene cyanide, α-chloroacrylonitrile, acrylic acid, the acrylic esters, such as the methyl, ethyl, propyl, butyl, etc. acrylates; methacrylic acid and its esters, such as the methyl, ethyl, propyl, butyl, hexyl, phenyl, etc. methacrylates; itaconic anhydride itaconic acid and their mono- and diesters, such as the methyl, ethyl, propyl, etc. esters; the acrylic, methacrylic, chloroacrylic, and the cyanoacrylic amides, N-alkyl amides, N,N-dialkyl amides; the alkenylaryl compounds, such as styrene, the monomethyl styrenes, the dimethyl styrenes, alphamethyl styrenes, the mono-, di-, and trichlorostyrenes, the o-, m-, and p-acetamido styrenes; vinyl naphthalene, vinyl carbazole, etc.; the alkenylaryl heterocyclic compounds, such as vinyl pyridine, vinyl methyl pyridine, vinyl quinoline; the diene-1,3 compounds, such as butadiene-1,3-methyl vinyl ketone, ethyl vinyl ketone, methyl isopropenyl ketone, N-vinyl imidazole, the vinyl azlactones, vinyl ketone, methyl isopropenyl ketone, the N-vinyl-2-oxazolidinones, maleic anhydride, dimethyl maleate, etc.

It is generally advantageous from an efficiency viewpoint that the various types of monomers used in the practice of this invention have no more than about 20 carbon atoms.

The chelating polymers made by the process of this invention are useful in recovering the metals which form chelates. These are disclosed in "Chemistry of Metal Chelates," by Martell and Calvin, published by Prentice-Hall (1956). Page 182 of this book has a table showing the periodic classification of chelate-forming metals. Those metals for which the process of this invention is particularly appropriate are those of groups III and IV of the periodic table having atomic weights of at least 26, those of groups V, VI, and VII having atomic weights of at least 50, as well as magnesium and the metals of group VIII. This invention is very useful in recovery of rare earths or lanthanides, and the actinides since they generally are found in very dilute concentrations and generally are otherwise very difficult to recover and separate. Specific metals for which this process is particularly appropriate include aluminum, titanium, vanadium, silicon, chromium, manganese, iron, cobale, nickel, copper, zinc, magnesium, gallium, germanium, arsenic, ytterbium, zirconium, columbium, molybdenum, technetium, ruthenium, rhodium, palladium, silver, cadmium, indium, tin, antimony, hafnium, tantalum, tungsten, rhenium, osmium, iridium, platinum, gold, mercury, thallium, lead, bismuth, scandium, lanthanum, thorium, uranium, plutonium, etc.

While reference is sometimes made herein to recovery of the metal, it is intended to include recovery of the metal in the cationic form or in the form of its compound, or in accordance with whatever manner the metal exists in the chelate form and the state in which it is subsequently removed from the chelated polymer.

The following examples are given to illustrate better various methods for the practice of this invention and are not intended in any way as a limitation on the methods of practicing the invention. Parts and percentages are by weight unless otherwise indicated.

*Example I*

Fifty parts of distilled water, 0.5 part of hydroxy apatite (0.005 to 0.2 micron size), 0.01 part of sodium dodecylbenzenesulfonate, 2.5 parts of commercial divinylbenzene (approx. 50% DVB–50% ethylstyrene) and 45 parts of divinylbenzene monoepoxide, 0.2 part of benzoyl peroxide are mixed in a suitable reaction flask and stirred for 15 hours at 90° C., and there is obtained a crosslinked polymer having a plurality of the repeating unit,

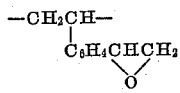

When divinylbenzene in the above procedure is replaced by diisopropenyl benzene, glycol dimethacrylate, diallylmaleate, or allyl acrylate similar crosslinked copolymers are obtained, and can be used with similar results in the following examples.

*Example II*

Fifty parts of distilled water, 0.5 part of hydroxy apatite (0.005 to 0.2 micron size), 0.02 part of sodium dodecylbenzene sulfonate, 2.8 parts of commercial divinylbenzene (approx. 50% DVB–50% ethyl styrene) and 40 parts of vinylphenoxy glycidyl ether are mixed in a suitable reaction flask and heated for 12 hours at 80° C. and 5 hours at 90° C. and there is obtained a crosslinked polymer having repeating units of the structure

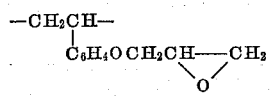

When the divinylbenzene in the above procedure is replaced by diisopropenyl benzene, glycol dimethacrylate, diallyl maleate, or allyl acrylate similar crosslinked polymers are obtained, and when other alkenylaryloxyepoxyalkanes are substituted for the vinylphenoxyepoxypropane in this example, the corresponding crosslinked postreactive polymers are obtained and can be used with similar results as shown in later examples.

*Example III*

Fifty parts of styrene, 2.6 parts of commercial divinylbenzene (containing approx. 50% DVB–50% ethyl styrene), 1 part of α,α-azobisisobutyronitrile, and 45 parts of acryl chloride are heated at 45° C. for 12 hours, at 60° C. for 18 hours, at 80° C. for 18 hours, and 100° C. for 12 hours, following which the hard copolymer is ground in a dry atmosphere to small granules and washed with 3–100 part portions of dry heptane. When the divinylbenzene in the above procedure is replaced by diisopropenyl benzene, glycol dimethacrylate, diallyl maleate, or allyl acrylate, similar cross-linked polymers are obtained which can be used with similar results, as in the following examples. When the chloroacrylyl chloride is replaced by methacrylyl chloride, α-chloroacrylyl chloride, α-cyanacrylyl chloride, fumaryl chloride, and acrylyl bromide, acrylyl iodide, acrylyl fluoride, methacrylyl bromide, and the like, the corresponding crosslinked polymer is obtained which can be used with similar results as shown in some cases in later examples.

*Example IV*

A mixture of 7.5 parts of iminoacetic acid, 15 parts of the polymer of Example I and 500 parts of dioxane are stirred at room temperature for 12 hours and 15 parts of tributyl amine added following which the mixture is heated for 12 hours at 70–89° C., and at the end of that time 2000 parts of water is added and there is obtained a chelating polymer having repeating units of the structure

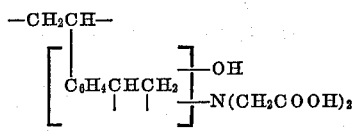

as the tributyl ammonium salts, which when immersed in a 10% NaOH solution are converted to the sodium salts

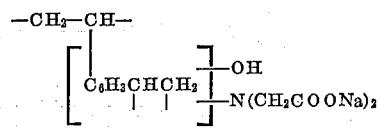

When KOH, LiOH, CsOH, or Ca(OH)₂ solutions are used, the corresponding salts are obtained, from which the free acid is readily obtained by treatment with inorganic acids, such as HCl, H₂SO₄, H₃PO₄, etc.

*Example V*

The procedure of Example IV is repeated using 5.9 isovaline instead of the iminoacetic acid and there is obtained the corresponding polymer having repeating units of the structure

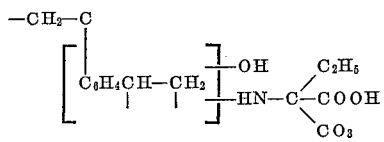

Example VI

The procedure of Example IV is repeated using 6 parts of isovaline instead of the iminoacetic acid and there is obtained the corresponding polymer having repeating units of the structure,

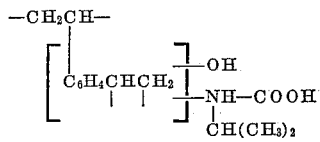

When 6 parts of norvaline are used instead of isovaline, the corresponding groups of the structure

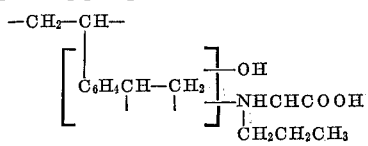

are obtained.

Example VII

The procedure of Example IV is repeated using 5.85 parts of aspartic acid instead of the iminodiacetic acid, and there is obtained the corresponding polymer having repeating units of the structure,

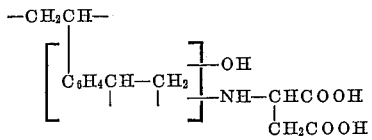

whose chelating properties are similar to those of the polymer of Example IV.

Example VIII

When the procedure of Example IV is repeated five times using individually in place of the iminodiacetic acid, (a) 3.75 parts of glycine, (b) 4.4 parts of alanine, (c) 5.5 parts of aminobutyric acid, (d) 8.25 parts of leucine, and (e) 7.55 parts of phenyl glycine respectively, there are obtained the corresponding polymers having repeating units of the structures (a′) 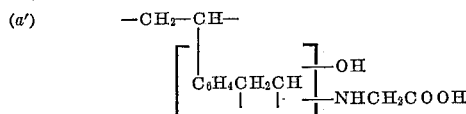

(b′) 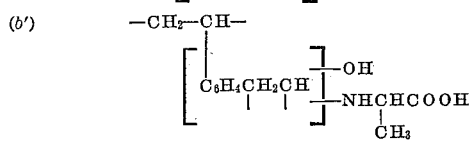

(c′) 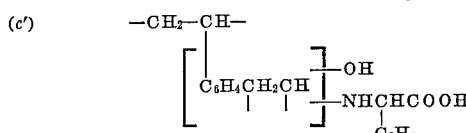

(d′) 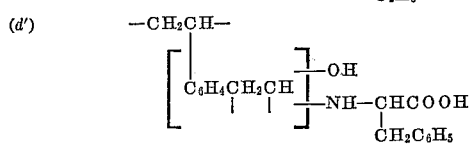

(e′) 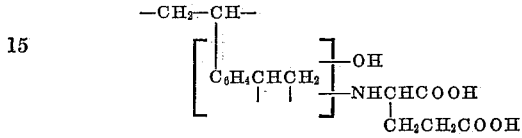

respectively, each of which has good chelating properties for metal ions.

Example IX

When 7.25 parts of glutamic acid are substituted for the 5.85 parts of aspartic acid of Example VII, there is obtained the corresponding polymer having

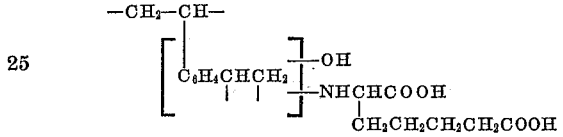

repeating units; and when 8.75 parts of aminopimelic acid are used instead of the aspartic acid, there is obtained the corresponding polymer having

—CH₂—CH—

[C₆H₄CHCH₂ ]—OH
         |  |   —NHCHCOOH
                  |
                  CH₂CH₂CH₂CH₂COOH repeating units and both polymers have marked chelating properties for metal ions.

Example X

When the procedure of Example IV is repeated using 5.95 parts of hydroxyethyl glycine instead of the iminoacetic acid there is obtained a polymer having repeating units of the structure.

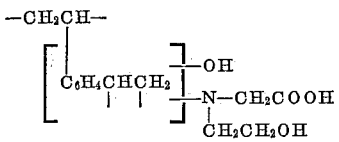

Example XI

When the procedure of Example IV is repeated using 6.1 parts of cysteine instead of the iminoacetic acid there is obtained the corresponding polymer having groups of the structure,

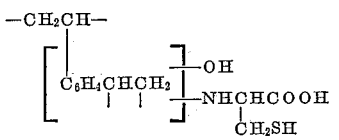

and when 7.45 parts of methionine are used instead of the cysteine, the corresponding polymer having

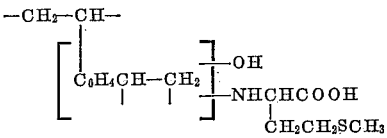

structures, is obtained; and when 5.3 parts of serine is used instead of cysteine, the polymer has repeating units of the structure

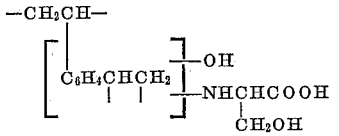

Example XII

Fifteen parts of the polymer of Example I are completely immersed in 100 parts of concentrated ammonium hydroxide for 48 hours, and the polymers then removed by filtration and washed, by immersion in five 100 part portions of distilled water, and there is obtained a polymer having repeating units of the structure,

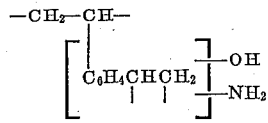

which exhibit coordination properties as such, and which also can be used as an anion exchange resin.

*Example XIII*

To a solution containing 15 parts of chloroacetic acid, 14 parts of NaOH, and 100 parts of water there is added 15 parts of the polymer of Example I and the mixture heated at 85–95° C. for 45–60 minutes, following which the mixture is cooled, the polymer removed by filtration and washed by immersion in five 100 part portions of distilled water. A polymer is obtained corresponding to the polymer of Example IV but in the form of the sodium salt.

*Example XIV*

The procedure of Example IV is repeated using 7.9 parts lysine instead of iminoacetic acid and there is obtained a polymer having repeating units of the structure

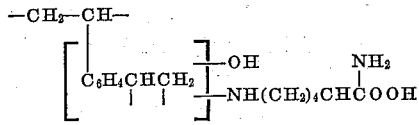

which has marked chelating properties, and when this polymer is treated with excess chloroacetic acid by the procedure of Example XIII, there is obtained a polymer having groups of the structure

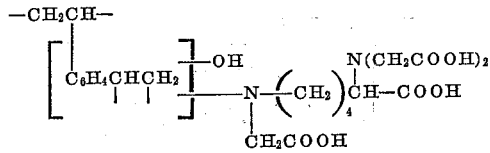

*Example XV*

The procedures of Examples IV to XIV are repeated using the polymer of Example II and there are obtained similar chelating polymers having instead of the

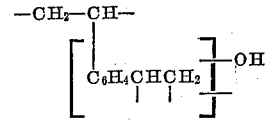

structure, the corresponding structure

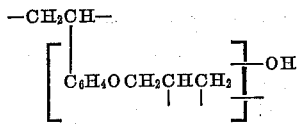

*Example XVI*

To 100 parts of dioxane are added 9 parts of the polymer of Example III and the mixture stirred for 12 hours, following which there is added 7.5 parts of iminoacetic acid and 19 parts of tributyl amine and the mixture stirred for an additional three hours, following which the mixture is heated at 50–60° C. for 8 hours. The reacted polymer is then removed by filtration, washed with water and immersed in 1000 parts of 10% NaOH for 12 hours, following which it is washed, by immersion in five 100-part portions of distilled water and there is obtained a chelating polymer having repeating units of the structure

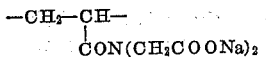

When the corresponding aminoacids of Examples V to XI inclusive are substituted for the iminoacid, the corresponding amides of the aminoacids, having repeating units of the structure

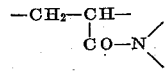

are obtained.

*Example XVII*

When the procedure of Example XVI is repeated, using respectively instead of the iminoacetic acid, an equivalent portion of each of the following HZ compounds, (a) 2-aminopyridine
(b) Triethylene tetramine
(c) 4-aminothiophenol
(d) 1-amino-4-hydroxyanthroquinone
(e) 4-nitrosopiperazine
(f) 4-aminoresorcinol
(g) 2,4-dihydroxybenzoic acid
(h) 4-(o-hydroxyphenyl)-3-butene-2-one
(i) Kojic acid
(j) 5-aminouracil
(k) 2,4-dihydroxybenzaldehyde
(l) 2,4-dihydroxybenzaldehyde-oxime there are obtained chelating polymers having attached to the

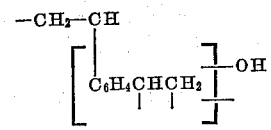

structure respectively the following radicals:

(a′) 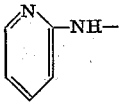

(b′) H$_2$NCH$_2$CH$_2$NHCH$_2$CH$_2$NHCH$_2$CH$_2$NH
(c′) HSC$_6$N$_4$NH—
(d′) 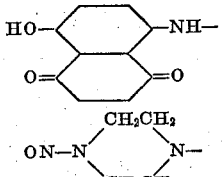

(e′) 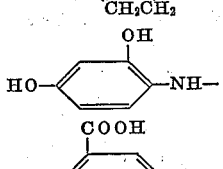

(f′) 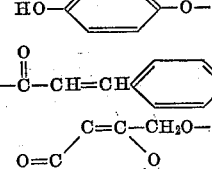

(g′) 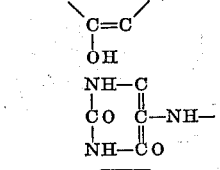

(h′) 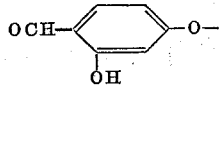

(i) 

(j′) NH—C
     |   ||
     CO  C—NH—
     |   ||
     NH—CO (k′) OCH—⟨⟩—O—
         |
         OH (')
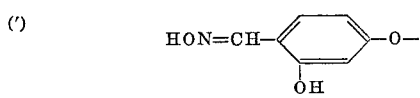

EXAMPLE XVIII

When the procedure of Example XVII is repeated using, instead of the polymer of Example I, the polymer of Example II, there are obtained respectively the corresponding polymers with the radicals (a') to (l') inclusive attached to the structure,

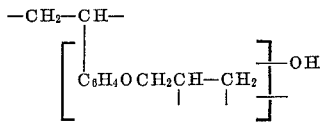

EXAMPLE XIX

The procedure of Example XVI is repeated, using, instead of the iminoacetic acid, equivalent portions of the HZ compounds, (a) to (l) inclusive, of Example XVIII, and there are obtained the corresponding chelating polymers having attached to the

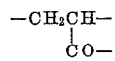

structure, respectively the radicals (a') to (l') inclusive as shown in Example XVII.

Some of the chelating polymers of this invention, as described above, have repeating unit formulas which can be represented by the following:

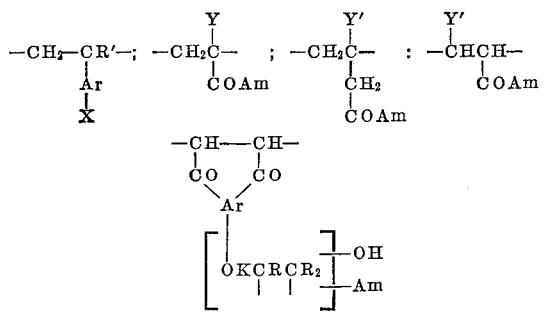

In these formulas X is a monovalent radical having a formula selected from the following:

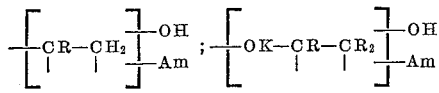

—COAm, and —OKCOAm; Ar is an aromatic nucleus, being either divalent or trivalent as shown in the above formulas; R is hydrogen or an alkyl radical, preferably having no more than about 8 carbon atoms; R' is hydrogen or a methyl group; Y represents chlorine, the cyano group, —CH$_2$COOR, —CH$_2$CONR$_2$, or —CH$_2$COAm groups; Y' represents —COOR, —CONR$_2$ or —COAm; Am is a radical derived from the amino acids described above and can be defined as a monovalent aliphatic radical in which the valency is attached to an amino nitrogen therein. The radical can have a plurality of amino and carboxylic groups therein. One of the amino groups should be no farther than two carbon atoms from a carboxylic group. Preferably the amino acid radical should have no more than about 20 carbon atoms therein, advantageously no more than about 10 carbon atoms. The carboxylic group can be in the form of a free acid, the metal salts, the ammonium base salts, or the alkyl or aryl esters thereof, said alkyl and aryl ester groups having no more than about 8 carbon atoms therein.

As used herein, the terms "lower alkyl," "lower hydroxyalkyl," "lower" mercaptoalkyl," and "lower aryl" are intended to include such groups having no more than about 10 carbon atoms, such as methyl, ethyl, propyl, isopropyl, butyl, secondary butyl, amyl, secondary amyl, hexyl, heptyl, nonyl, decyl, secondary hexyl, secondary nonyl, benzyl, phenethyl, hydroxyethyl, hydroxypropyl, hydroxybutyl, hydroxyamyl, mercaptoethyl, mercaptomethyl, mercaptopropyl, mercaptoamyl, methylmercaptomethyl, methylmercaptoethyl, ethylmercaptomethyl, ethylmercaptoethyl, ethylmercaptopropyl, phenyl, tolyl, dimethylphenyl, napthyl, ethylphenyl, propylphenyl, butylphenyl, etc. groups.

The ammonium bases defined herein for M include the ammonium radical and various substituted ammonium radicals having various substituents thereon, such as alkyl groups, aryl groups, hydroxyalkyl groups, etc., preferably those having no more than about 21 carbon atoms, advantageously those having no more than about 10 carbon atoms. Typical examples of such substituted ammonium radicals include those derived from ammonia, methyl amine, dimethyl amine, trimethyl amine, ethyl amine, diethyl amine, triethyl amine, propyl amine, butyl amine, dibutyl amine, tributyl amine, trihexyl amine, triheptyl amine, ethanol amine, diethanol amine, triethanol amine, isopropanol amine, diisopropanol amine, triisopropanol amine, methyl diethanol amine, dimethyl ethanol amine, morpholine, dimethyl benzyl amine, pyridine, ethyl pyridine, quinoline, isoquinoline, amino pyridine, guanidine, biguanidine, aniline, methyl aniline dimethyl aniline, phenylene diamine, piperazine, triethylene di-imine

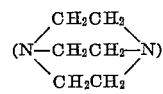

hydrazine, methyl hydrazine, symmetrical dimethyl hydrazine, phenyl hydrazine, amino imidazole, amino diazines, hydrazino triazines, etc.

Typical metals that can be used in substitution for M in the formulas given herein, include lithium, sodium, potassium, rubidium, cesium, calcium, strontium, barium, and the chelate-forming metals as disclosed in "Chemistry of Metal Chelates," by Martell and Calvin, published by Prentice-Hall (1956). Page 182 of this book shows the periodic classification of chelate-forming metals.

The polymers of this invention can be used as chelating resins to recover and to separate chelating metals by various methods including those described in my copending application, Serial No. 28,563 filed the same date herewith.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A cross-linked polymer having a plurality of repeating units in the linear chains thereof having a formula selected from the class consisting of:

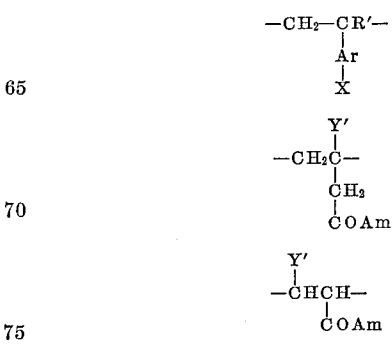

and

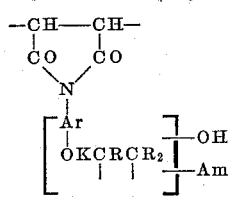

wherein X is a monovalent radical having a formula selected from the class consisting of:

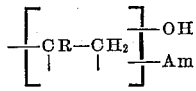

—COAm, and —OKCOAm; Ar is an aromatic nucleus, R is a radical selected from the class consisting of hydrogen and alkyl radicals having no more than 8 carbon atoms; R' is a radical selected from the class consisting of hydrogen and methyl radicals; Y is a radical selected from the class having the formulas —Cl, —CN, —CH$_3$, —CH$_2$COOR, —CH$_2$CONR$_2$, and —CH$_2$COAm; Y' is a radical selected from the class having the formulas —COOR, —CONR$_2$, and —COAm; K is a divalent, saturated aliphatic hydrocarbon radical having no more than 10 carbon atoms in the linear chain between said two valencies and having a total of no more than 20 carbon atoms in said radical and Am is a monovalent aliphatic radical having said valency attached to an amino nitrogen therein, having at least one amino group and at least one carboxylic group therein, having an amino group no farther than two carbon atoms from a carboxylic group, having no more than about 20 carbon atoms therein, said carboxylic group being in the form of a radical selected from the class consisting of the free acid, metal salts thereof, ammonium base salts thereof, and alkyl and aryl esters thereof having no more than about eight carbon atoms in said ester group.

2. A cross-linked polymer having a plurality of repeating units in the linear chains thereof having the structure

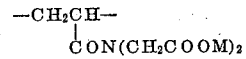

wherein M represents a radical selected from the class consisting of hydrogen, metals, ammonium bases, and alkyl and aryl radicals having no more than about 8 carbon atoms therein.

3. A cross-linked polymer having a plurality of repeating units in the linear chains thereof having the structure

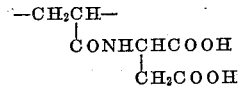

References Cited by the Examiner
UNITED STATES PATENTS

| | | | |
|---|---|---|---|
| 2,630,429 | 3/1953 | Hwa | 260—2.1 |
| 2,752,269 | 6/1956 | Condo et al. | 260—78.4 |
| 2,834,758 | 5/1958 | Shacklett et al. | 260—78 |
| 2,839,514 | 6/1958 | Shokal et al. | 260—88.1 |
| 2,875,163 | 2/1959 | Morris | 260—78 |
| 2,988,535 | 6/1961 | Feuchtbaum et al. | 260—47 |
| 2,993,920 | 7/1961 | Budde et al. | 260—78.4 |
| 3,022,262 | 2/1962 | Hyde | 260—78.4 |
| 3,028,370 | 4/1962 | Wheelock | 260—78.4 |
| 3,090,771 | 5/1963 | D'Alelio | 260—78 |

JOSEPH L. SCHOFER, *Primary Examiner.*

B. MANGAN, H. N. BURSTEIN, *Examiners.*